Feb. 24, 1925.
A. KINZBACH
1,527,310
EXHAUST LINE FOR ENGINES
Filed Dec. 1, 1922
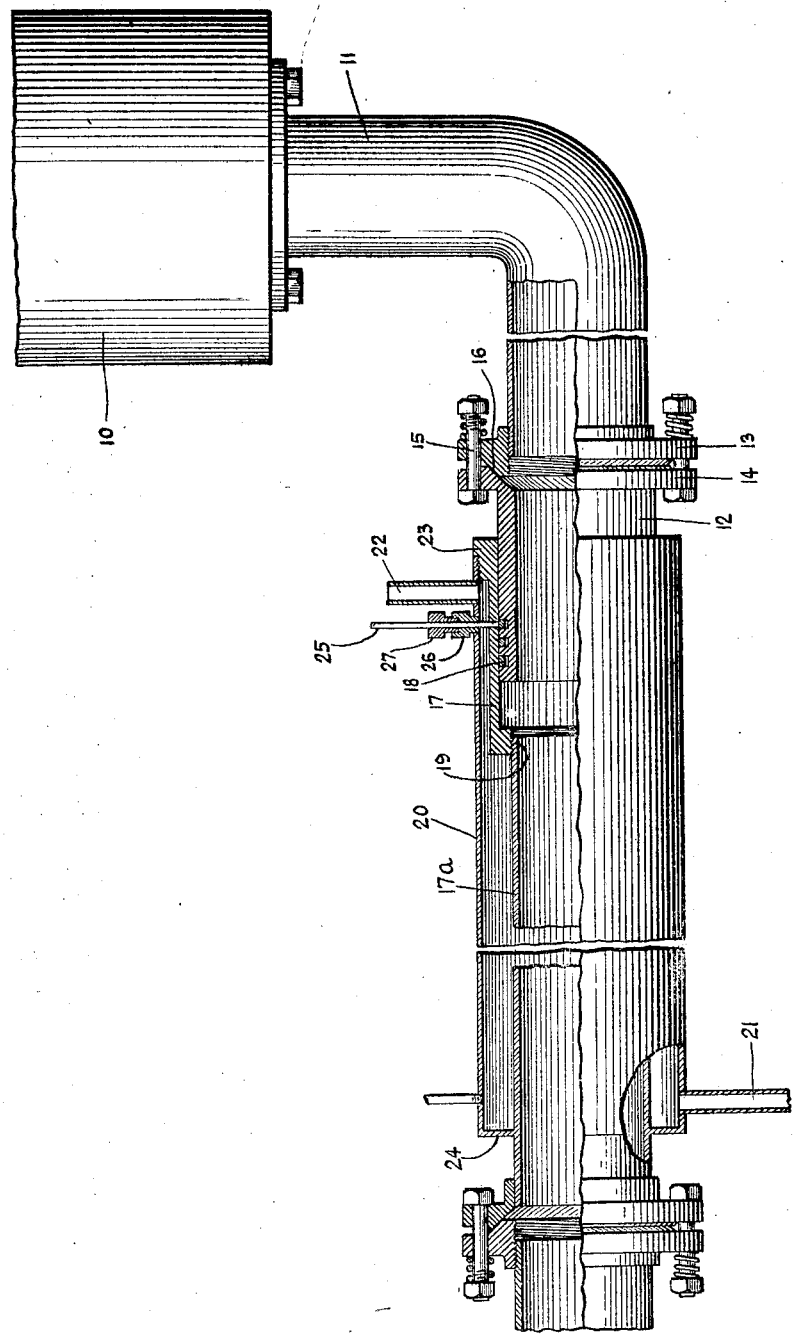

Patented Feb. 24, 1925.

1,527,310

UNITED STATES PATENT OFFICE.

ALFRED KINZBACH, OF SOUR LAKE, TEXAS.

EXHAUST LINE FOR ENGINES.

Application filed December 1, 1922. Serial No. 604,288.

*To all whom it may concern:*

Be it known that I, ALFRED KINZBACH, a citizen of the United States of America, and a resident of Sour Lake, county of Hardin, and State of Texas, have invented certain new and useful Improvements in Exhaust Lines for Engines, of which the following is a specification.

This invention relates to exhaust lines or conduits for engines, such as internal combustion engines, and has particular reference to the provision of an expansion joint in exhaust pipes or other conduits which are required to withstand high temperatures.

Difficulty is frequently experienced in providing exhaust pipes for internal combustion engines that are capable of standing the excessive expansion and contraction to which these pipes may be subjected. For example, in some of the heavy oil engines, such as those of the Diesel type, the exhaust elbow has been connected to the exhaust manifold by means of bolts provided with springs so as to allow a longitudinal expansion in the line. This type of construction, while permitting the necessary expansion, is subject to a great disadvantage in that when the engine is being warmed up after starting the springs permit a space to exist between the flanges of the elbow and exhaust manifold with the result that frequently sparks are emitted. In cases where the engine is employed in pump houses used for pumping oil dangerous fires have occurred due to ignition of oil by flying sparks.

The primary object of my invention is to obviate difficulties of this nature and to provide an exhaust pipe or conduit that is of a flexible nature so that it may accommodate itself to contraction and expansion without thereby permitting any leakage.

My invention in its broadest aspects contemplates an expansion joint for a line in which telescoping members are employed which are adapted to have a longitudinal movement with reference to each other and in which sealing rings are interposed between said members so as to effect a fluid tight joint therebetween.

A feature of the invention is the provision of suitable cooling means for the pipe and joint.

Another feature of the invention is the provision of means for lubricating the sealing rings or the contacting surfaces of the telescoping members so as to facilitate movement therebetween.

The invention has particular reference to certain novel features of construction, operation, and arrangement of parts an example of which is given in this specification and illustrated in the accompanying drawing which is a view in elevation partially broken away.

In the particular example of the invention thus illustrated an exhaust manifold 10 of an engine is shown communicating with an exhaust elbow 11, the manifold and elbow being preferably held together by means of a rigid joint as illustrated. The elbow is connected to a pipe or cylindrical member 12, the elbow and pipe being preferably equipped with flanges 13 and 14, respectively, by which the pipes may be held together, as by means of bolts 15. Cooperating ground surfaces are preferably formed at 16 in order to provide a ball joint.

The pipe 12 constitutes the inner member of the telescoping members of which the outer one is in the form of a sleeve 17. The pipe 12 is adapted to form a fairly tight fit within the sleeves 17 but there is sufficient clearance to permit a longitudinal movement between the members 12 and 17. A plurality of sealing rings 18 are interposed between the telescoping members; as shown the rings are arranged in peripheral grooves in the inner pipe 12.

In the particular arrangement illustrated the pipe 17 is provided with a communicating member or extension 17ª, the pipes 17 and 17ª being connected, as by means of a threaded joint at 19. The pipe 17ª is shown as being of smaller internal diameter than the cylinder 17; the latter of course is required to have sufficient diameter to accommodate the inner pipe 12. It is to be observed that it is not necessary that there be any difference in the diameter between members 17 and 17ª and, if desired, the two members may be formed integrally.

An outer casing or jacket 20 is arranged about the pipes 17 and 17ª, and is provided with an inlet pipe 21 and an outlet pipe 22 for the purpose of providing a circulation of cooling fluid through the jacket. In the arrangement illustrated the cylinder 17 is equipped with a flange portion 23 in order that the casing 20 may be threadedly attached thereto in the manner shown, and at the other end of the casing a closure is effected by means of an annular member 24 which may be welded to the pipes 20 and 17ª. Obviously various structural modifications may be made in carrying out the inventive idea described.

A line 25 is provided for the purpose of supplying a lubricant to the sealing rings or to the contacting surfaces between the outer and inner telescoping members. As clearly shown in the drawing the pipe is held in position by a plug 26 secured in a threaded hole in the casing 20 and by a bushing 27, the plug and bushing being centrally bored to accommodate the pipe 25. A lubricant may be introduced to the contacting surfaces of the joint through the pipe 25 by a gravity feed, by forced feed, or in any other suitable manner.

From the foregoing description it is apparent that my invention provides a pipe line or conduit in which the movement of telescoping members takes up the expansion and contraction in a line which may thus be subjected to excessive temperatures and great variations in expansion and contraction without any leakage. Moreover the invention when applied to an internal combustion engine may be utilized to effect a cooling of the exhaust gases which causes the engine to run more smoothly and reduces the danger of fire.

Apparatus of preferred form and construction has been illustrated and described for the purpose of showing a way in which this invention may be used but the inventive thought upon which the application is based is broader than the illustrative embodiment thereof and I therefore intend no limitations other than those imposed by the appended claim.

What I claim is:

In an exhaust line for internal combustion engines, a pair of telescoping pipes one of which is adapted to communicate with the engine, sealing rings for said telescoping pipes, a chamber disposed about said telescoping pipes, means for introducing liquid to said chamber, means for withdrawing liquid from said chamber and means for supplying a lubricant between said telescoping pipes.

In witness whereof I have hereunto set my hand this 13th day of November, 1922.

A. KINZBACH.